(12) United States Patent
Russell et al.

(10) Patent No.: US 10,369,696 B1
(45) Date of Patent: Aug. 6, 2019

(54) SPATIOTEMPORAL ROBOT RESERVATION SYSTEMS AND METHOD

(71) Applicant: X Development LLC, Mountain View, CA (US)

(72) Inventors: Jared Russell, San Francisco, CA (US); Julian Mac Neille Mason, Redwood City, CA (US); Kurt Mauro Dresner, Kenmore, WA (US)

(73) Assignee: X DEVELOPMENT LLC, Mountain View, CA (US)

( * ) Notice: Subject to any disclaimer, the term of this patent is extended or adjusted under 35 U.S.C. 154(b) by 203 days.

(21) Appl. No.: 15/641,882

(22) Filed: Jul. 5, 2017

Related U.S. Application Data

(63) Continuation of application No. 14/832,656, filed on Aug. 21, 2015, now Pat. No. 9,744,668.

(51) Int. Cl.
   B25J 9/16 (2006.01)

(52) U.S. Cl.
   CPC ............ B25J 9/1666 (2013.01); *Y10S 901/01* (2013.01); *Y10S 901/09* (2013.01)

(58) Field of Classification Search
   CPC ...... B25J 9/1666; Y01S 901/01; Y01S 901/09
   See application file for complete search history.

(56) References Cited

U.S. PATENT DOCUMENTS

| | | | |
|---|---|---|---|
| 7,321,808 B2 | 1/2008 | Nagamatsu | |
| 7,765,031 B2 | 7/2010 | Nagamatsu | |
| 7,769,491 B2 | 8/2010 | Fukuchi et al. | |
| 8,315,738 B2 | 11/2012 | Chang et al. | |
| 8,504,494 B2 | 8/2013 | Jaros et al. | |
| 8,818,558 B2 | 8/2014 | Cassano et al. | |
| 8,855,812 B2 | 10/2014 | Kapoor | |
| 2005/0216124 A1* | 9/2005 | Suzuki | G05D 1/027 700/253 |
| 2005/0273200 A1 | 12/2005 | Hietmann | |

(Continued)

OTHER PUBLICATIONS

Au, T. C., Fok, C. L., Vishwanath, S., Julien, C., & Stone, P. (Oct. 2012). Evasion planning for autonomous vehicles at intersections. In Intelligent Robots and Systems (IROS), 2012 IEEE/RSJ International Conference on (pp. 1541-1546). IEEE.

(Continued)

*Primary Examiner* — Mary Cheung
(74) *Attorney, Agent, or Firm* — Middleton Reutlinger

(57) ABSTRACT

Methods, apparatus, systems, and computer-readable media are provided for spatiotemporal reservations for robots. In various implementations, a sequence of spatial regions of an environment, and a sequence of respective time intervals that are reserved for a robot to operate within the sequence of spatial regions, may be reserved for the robot. A default path through the sequence of spatial regions may be identified. During traversal of the default path, it may be determined that the default path will be unpassable by the robot through a given spatial region during a given time interval reserved for the robot to operate within the given spatial region. Thus, an alternative path through the given spatial region that is traversable by the robot during the given time interval may be identified. The robot may then be traversed along the alternative path through the given spatial region within the given time interval.

20 Claims, 7 Drawing Sheets

(56) References Cited

U.S. PATENT DOCUMENTS

| | | | |
|---|---|---|---|
| 2011/0231016 A1* | 9/2011 | Goulding | G06N 3/008 700/246 |
| 2014/0025201 A1* | 1/2014 | Ryu | G05D 1/02 700/245 |
| 2016/0008979 A1* | 1/2016 | Kirsten | B25J 9/1676 700/255 |

OTHER PUBLICATIONS

Makarem, L. (2015), Decentralized multi-robot coordination in crowded workspaces (Doctoral dissertation, ECOLE Polytechnique Federale De Lausanne); 170 pages.

* cited by examiner

SPATIOTEMPORAL ROBOT RESERVATION SYSTEMS AND METHOD

BACKGROUND

An autonomous or semi-autonomous robot must be capable of reacting to unexpected events. For example, a planned path or trajectory of the robot may become obstructed, e.g., by a static obstacle (e.g., an unmoving obstacle such as an unexpected piece of furniture) or a dynamic obstacle (e.g., a passerby or another robot). Additionally or alternatively, the planned path may become less desirable, e.g., because a hazard arises in the path (e.g., sprinkler, spilled fluids, etc.). When either happens, the robot should be able to react to avoid the obstacle or hazard, while still continuing to perform its assigned task within any associated constraints.

Autonomous and semi-autonomous robots may be capable of calculating and traversing alternative paths on-the-fly to avoid unexpected obstacles and hazards. However, as numbers of robots and potential hazards/obstacles in an environment increase—especially where the robots are deployed in the environment without advance knowledge of other robots operating in the environment—the more chaotic the environment will become. Once autonomous and semi-autonomous robots start traversing alternative paths to avoid hazards or obstacles, their future trajectories may become less predictable, increasing entropy in the environment and, as a consequence, increasing the likelihood that robots will encounter additional hazards and/or obstacles (such as each other). Additionally, taking alternative paths around obstacles or hazards may affect robots' abilities to perform assigned tasks satisfactorily (e.g., within various constraints).

SUMMARY

The present disclosure is generally directed to methods, apparatus, and computer-readable media (transitory and non-transitory) for avoiding robot collisions. An environment in which a plurality of autonomous and/or semi-autonomous robots operate may be partitioned into spatial regions, which may or may not be uniform in shape and/or size. A robot that is to traverse from one location to another may determine (or may have determined on its behalf) a default path between the locations. A sequence of contiguous spatial regions through which the default path passes may be determined. Those regions may be "reserved" for the robot during a corresponding sequence of time intervals, thus defining a "sliding window" through a sequence of so-called "spatiotemporal regions." Other robots may be either excluded from the reserved spatial regions during the corresponding time intervals, or only permitted in the reserved spatial regions to the extent possible without interfering with the robot's ability to perform its responsibilities. For example, if one robot is to hand an object to another robot, both may be permitted in the same region during the same time interval to do so. But for the most part, only a single robot may occupy a spatial region during a reserved time interval.

In some implementations, a computer implemented method may be provided that includes: identifying, by an at least semi-autonomous robot, a sequence of spatial regions of an environment that are reserved for the robot; identifying, by the robot, a sequence of respective time intervals that are reserved for the robot to operate within the sequence of spatial regions; identifying, by the robot, a default path through the sequence of spatial regions, wherein the default path is traversable by the robot during the sequence of time intervals that are reserved for the robot to operate within the sequence of spatial regions; determining, by the robot, that the default path will be unpassable by the robot through a given spatial region during a given time interval of the sequence of time intervals that is reserved for the robot to operate within the given spatial region; identifying, by the robot, an alternative path through the given spatial region, wherein the alternative path is traversable by the robot during the given time interval; and traversing, by the robot, the alternative path through the given spatial region within the given time interval.

This method and other implementations of technology disclosed herein may each optionally include one or more of the following features.

In various implementations, at least two of the sequence of time intervals may partially overlap. In various implementations, the sequence of spatial regions may include a sequence of contiguous spatial regions. In various implementations, the method further includes: determining, by the robot, that the first alternative path does not regain the default path through a subsequent region that immediately follows the given spatial region in the sequence of spatial regions; identifying, by the robot, a second alternative path through the subsequent region, wherein the second alternative path is traversable by the robot during a subsequent time interval during which the subsequent spatial region is reserved for the robot, and wherein the first alternative path connects to the second alternative path; and traversing, by the robot, the second alternative path through the subsequent region within the subsequent time interval. In various implementations, the alternative path may regain the default path through a subsequent region that immediately follows the given spatial region in the sequence of spatial regions.

In various implementations, determining that the default path will be unpassable by the robot through the given spatial region during the given time interval may include determining that an obstacle has been detected obstructing the default path. In various implementations, the detection may be performed by the robot. In various implementations, determining that the default path will be unpassable by the robot through the given spatial region during the given time interval may include determining that an obstacle is predicted to obstruct the default path during the given time interval.

In various implementations, the default path may be calculated by the robot. In various implementations, identifying the default path may include receiving, by the robot, from a remote computing device, data indicative of the default path. In various implementations, the alternative path may be calculated by the robot. In various implementations, identifying the alternative path may include receiving, by the robot, from a remote computing device, data indicative of the alternative path.

In another aspect, a robot may include: logic; one or more operational components operably coupled with the logic; and memory operably coupled with the logic. The memory may store instructions configured to cause the logic to: identify a sequence of spatiotemporal regions of an environment that are reserved for the robot; cause the operational components to move the robot through the spatiotemporal regions subject to an inter-region influence that tends to maintain the robot along a first path through all of the spatiotemporal regions; determine that the first path will be unpassable by the robot through a given spatiotemporal region; and cause the operational components to move the robot through the given spatiotemporal region subject to an intra-region influence that maintains the robot along a second path through the given spatiotemporal region, wherein the intra-region influence outweighs the inter-region influence.

Other implementations may include a non-transitory computer readable storage medium storing instructions executable by a processor to perform a method such as one or more of the methods described above. Yet another implementation may include a robot management system including memory and logic operable to execute instructions, stored in the memory, to implement one or more modules or engines that, alone or collectively, perform a method such as one or more of the methods described above.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
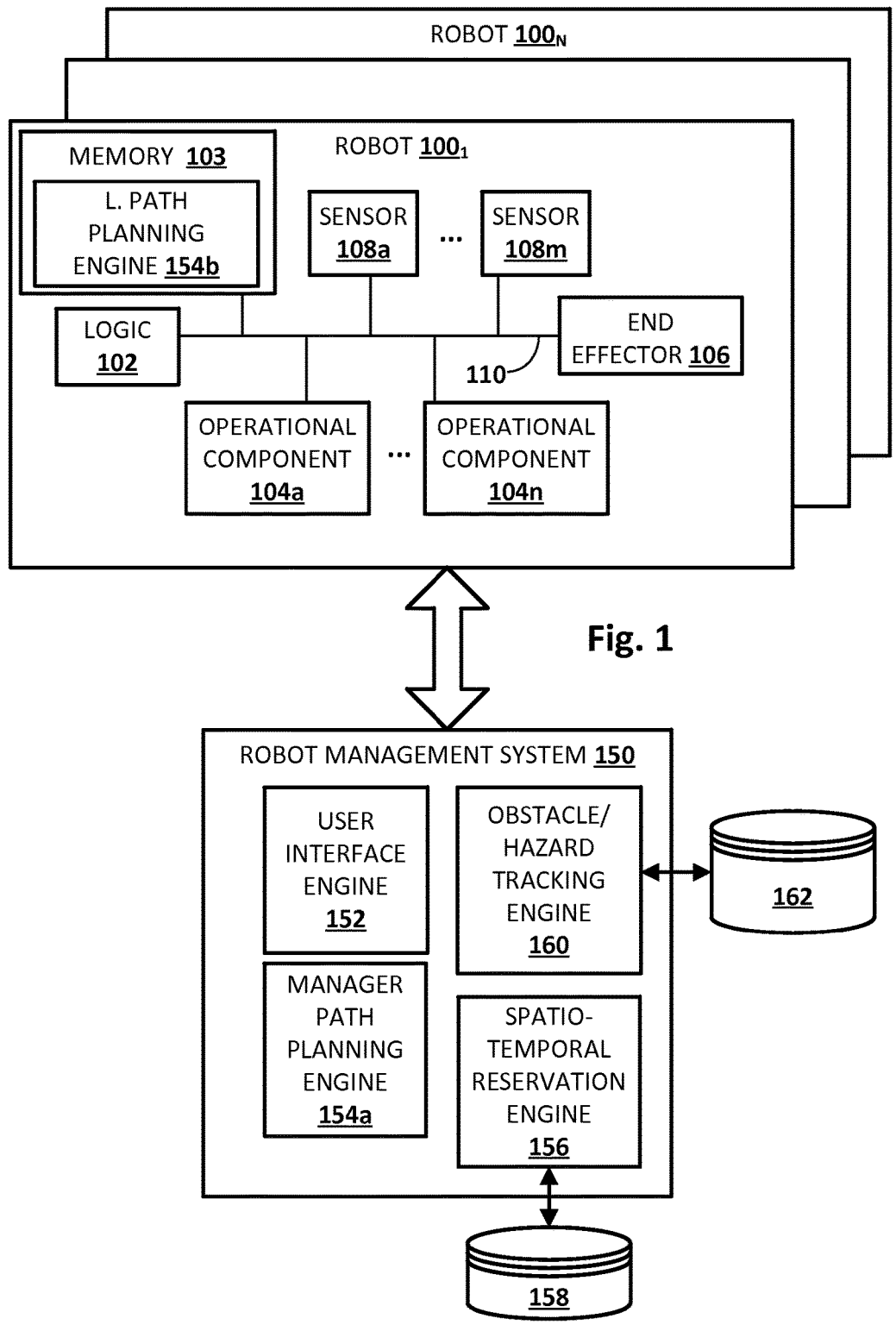
FIG. 1 schematically depicts an example environment in which disclosed techniques may be implemented, in accordance with various implementations.

FIG. 1 schematically depicts an example environment in which disclosed techniques may be implemented to reserve a sequence of spatiotemporal regions for one or more robots $100_{1-N}$, in accordance with various implementations. Each of robots $100_{1-N}$ may take various forms, including but not limited to a telepresence robot, a robot arm, a humanoid, an animal, an insect, an aquatic creature, a wheeled device, a submersible vehicle, an unmanned aerial vehicle ("UAV"), and so forth. Each robot may also include logic 102 operably coupled to memory 103 (e.g., RAM, ROM, DRAM, flash, etc.), one or more operational components 104a-n, one or more end effectors 106, and one or more sensors 108 via one or more buses 110. Logic 102 may, in various implementations, include one or more processors, such as one or more so-called "real time processors" that are guaranteed to perform various operations within various temporal constraints.

As used herein, "operational components" 104 of a robot may refer to actuators, motors (e.g., servo motors), joints, shafts, gear trains, wheels, tracks, pumps (e.g., air or liquid), pistons, drives, or other components that may create and/or undergo propulsion, rotation, and/or motion to move components of robot 100 relative to each other, and/or to move robot 100 as a whole. Some operational components may be independently controllable, although this is not required. In some instances, the more operational components robot 100 has, the more degrees of freedom of movement it may have.

As used herein, "end effector" 106 may refer to a variety of tools that may be operated by robot 100 in order to accomplish various tasks. For example, some robots may be equipped with various types of "grippers," including but not limited to "impactive" (e.g., "grab" objects using opposing digits), "ingressive" (e.g., physically penetrating an object using pins, needles, etc.), "astrictive" (e.g., using suction or vacuum to pick up an object), or "contigutive" (e.g., using surface tension, freezing or adhesive to pick up object). More generally, other types of end effectors may include but are not limited to drills, brushes, force-torque sensors, cutting tools, deburring tools, welding torches, and so forth.

Sensors 108 may take various forms, including but not limited to cameras, light sensors (e.g., passive infrared), pressure sensors, pressure wave sensors (e.g., microphones), proximity sensors, torque sensors, force sensors, radars, range finders, accelerometers, gyroscopes, compasses, position coordinate sensors (e.g., global positioning system, or "GPS"), speedometers, drop off sensors (e.g., to detect an edge of a raised surface), and so forth. While sensors $108a$-$m$ are depicted as being integral with robot 100, this is not meant to be limiting. In some implementations, sensors 108 may be located external to, but may be in direct or indirect communication with, robot 100, e.g., as standalone units or as part of robot management system 150.

Robots $100_{1-N}$ may be controlled and/or managed to various degrees by robot management system 150. Robot management system 150 may include one or computing systems connected by one or more networks (not depicted) that control and/or manage operation of robots $100_{1-N}$ to various degrees. An example of such a computing system is depicted schematically in FIG. 7. Various modules or engines may be implemented as part of robot management system 150 as software, hardware, or any combination of the two. For example, in FIG. 1, robot management system 150 includes a user interface engine 152, a "manager" path planning engine 154, a spatiotemporal reservation engine 156, and an obstacle/hazard tracking engine 160.

User interface engine 152 may be configured to receive, as input, commands from various sources, such as human technicians. User interface engine 152 may provide or otherwise make this input available to other components of robot management system 150. Additionally or alternatively, user interface engine 152 may provide one or more user interfaces, locally and/or distributed to remote computing devices (e.g., as interactive web pages), which may be operated by users such as technicians to perform various tasks, such as control robots $100_{1-N}$, provide input indicative of obstacles or hazards for obstacle/hazard tracking engine 160, and/or adjust various parameters related to spatiotemporal reservation engine 156.

A "manager" path planning engine 154a may be implemented on robot 100 or robot management system 150 and may be configured to plan a path or trajectory for one or more robots $100_{1-N}$, and provide data indicative of those paths to robots $100_{1-N}$. Manager path planning engine 154a may calculate a robot path based on a variety of constraints associated with a robot 100 and its assigned task, such as a starting point, an end point, desired task duration, etc. Additionally or alternatively, manager path planning engine 154a may calculate a robot path with various goals in mind, such as reducing and/or minimizing wear and tear on a robot 100, reducing/minimizing extraneous robot movement (which may pose a danger to nearby persons or objects), minimizing path distance, minimizing path traversal time, optimizing a robot's ability to observe obstacles and/or hazards while travelling, and so forth.

Additionally or alternatively, a "local" path planning engine 154b may be implemented in memory 103 of a robot 100 by logic 102. Local path planning engine 154b may be configured to calculate alternative paths for the robot 100 to traverse in the event the original path calculated by manager path planning engine 154a becomes unpassable. For example, suppose a path calculated by manager path planning engine 154a becomes impassable within a given spatial region during an associated time interval in which the robot 100 is permitted to operate in the given spatial region. Local path planning engine 154b may calculate an alternative path through the given region that is traversable by the robot 100 during the same given time interval.

In some implementations, manager path planning engine 154a and local path planning engine 154b may provide competing "influences" on robot 100 that cause robot to travel through a sequence of spatiotemporal regions in a particular way depending on the circumstances. For example, in some implementations, logic 102 may cause one or more operational components 104 of robot 100 to move robot 100 through a sequence of spatiotemporal regions subject to an inter-region influence, exerted by manager path planning engine 154a, that tends to maintain robot 100 along a first path through all of the reserved spatiotemporal regions. Should logic 102 of robot 100 determine that the first path will be unpassable by robot 100 through a given spatiotemporal region, logic 102 may cause one or more operational components 104 to move robot 100 through the given spatiotemporal region subject to an intra-region influence, e.g., exerted by local path planning engine 154b. The intra-region influence may maintain robot 100 along a second path through the given spatiotemporal region that avoids the obstacle or hazard. In various implementations, the intra-region influence exerted by local path planning engine 154b may outweigh the inter-region influence exerted by manager path planning engine 154a. However, in various implementations, the intra-region influence may only guide robot 100 inside of a spatiotemporal region reserved for robot 100.

Spatiotemporal reservation engine 156 may be operably coupled with an index 158 that stores records of environments in which robots 100$_{1-N}$ operate and various ways of partitioning those environments up onto spatial regions that may be reserved for use robots 100$_{1-N}$. For example, depending on the nature of the robots operating therein, an environment may be divided into a plurality of equally-sized, similarly-shaped spatial regions, into unequally-sized, differently shaped regions, or various combinations thereof.

Spatiotemporal reservation engine 156 may be configured to calculate and reserve, e.g., based on a path calculated by manager path planning engine 154a or local path planning engine 154b, a sequence of spatial regions of an environment through which robot 100 will pass in order for it to traverse the path. For example, suppose a robot 100 is to cross a room along a straight trajectory as part of the robot performing a particular task. Spatiotemporal reservation engine 156 may identify a linear sequence of contiguous spatial regions that encompass the trajectory, and may reserve the sequence for robot 100.

Spatiotemporal reservation engine 156 also may be configured to reserve a corresponding sequence of respective time intervals for the robot 100 to operate within the reserved sequence of spatial regions. Using the example above, spatiotemporal reservation engine 156 may determine, e.g., based on a projected velocity and/or acceleration of the robot 100 to perform its task, approximate time intervals during which the robot 100 will pass through each spatial region of the linear sequence of contiguous spatial regions. In some implementations, two or more of the sequence of time intervals may partially overlap, e.g., to provide sufficient time for the robot to avoid an obstacle or hazard within a particular spatial region, if necessary.

Obstacle/hazard tracking engine 160 may be configured to collect and maintain, e.g., in an index 162, records of static obstacles (e.g., furniture, inanimate objects) and/or dynamic obstacles (e.g., people, other robots, moving objects, etc.) and/or hazards (e.g., liquid spills, damaged floors, etc.) present in a robotic environment. Records of obstacles/hazards may be updated based on various sources. In some implementations, robots 100$_{1-N}$ may utilize various sensors (e.g., cameras, range finders) to observe obstacles/hazards in an environment while they perform their routine duties, and may report those observations to obstacle/hazard tracking engine 160. In some implementations, a user may be able to interact with user interface engine 152 to provide obstacle/hazard tracking engine 160 with input indicative of a newly discovered or changed obstacle or hazard. Records of obstacles/hazards in index 162 may be used, e.g., by manager path planning engine 154a and/or spatiotemporal reservation engine 156, to plan paths and/or reserve spatiotemporal regions. Additionally or alternatively, records of obstacles/hazards in index 162 may be used, e.g., by local path planning engine 154b and/or spatiotemporal reservation engine 156, to calculate alternative paths through spatiotemporal regions around obstacles/hazards.

While robot 100$_{1-N}$ and robot management system 150 are depicted separately in FIG. 1, this is not meant to be limiting. In various implementations, one or more aspects (e.g., modules, engines, etc.) depicted in FIG. 1 as implemented on robots 100$_{1-N}$ or robot management system 150 may be implemented on the other, may be distributed across both, and/or may be distributed across one or both in combination with other components not depicted in FIG. 1. For example, manager path planning engine 154a and/or local path planning engine 154b may be implemented in whole or in part on a robot 100 or robot management system 150. In implementations in which robots 100$_{1-N}$ and robot management system 150 are separate, they may communicate over one or more wired or wireless networks (not depicted) or using other wireless technology, such as radio, Bluetooth, infrared, etc.

Figure 2:
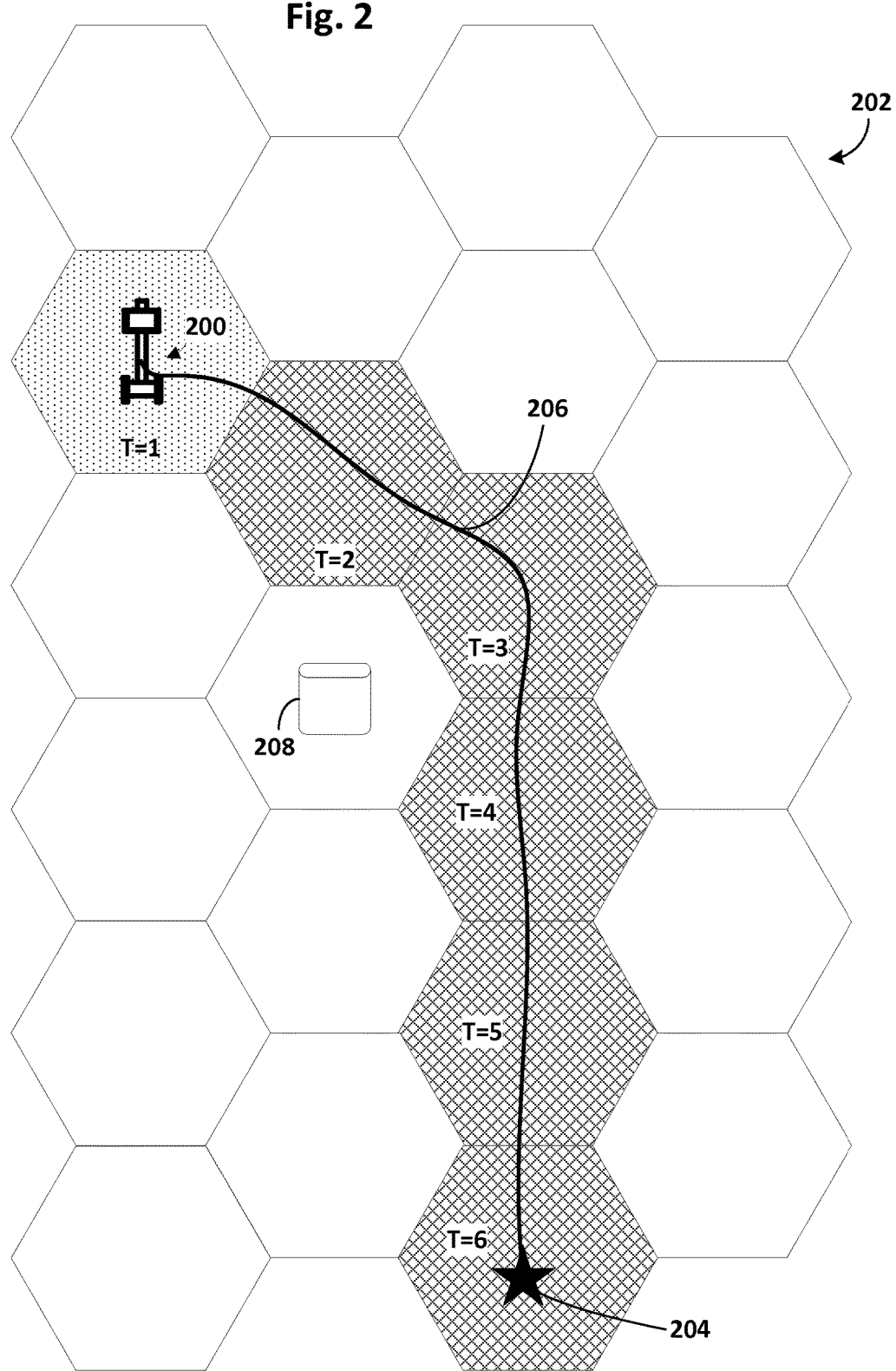
FIG. 2 schematically depicts an example where disclosed techniques have been implemented to reserve a sequence of spatiotemporal regions for a robot, in accordance with various implementations.

FIG. 2 schematically depicts an example where disclosed techniques have been implemented to reserve, for a robot 200 (similar to 100), a sequence of spatiotemporal regions within an environment 202 in which robot 200 operates. In this example, environment 202 is logically partitioned into a grid of equally-sized hexagons. However, it is not required that environments be logically partitioned into such homogenous spatial regions. In some implementations, environment 202 may be logically partitioned into a plurality of spatial regions of different shapes and/or sizes.

A destination of robot 200, e.g., that robot 200 will reach as part of performing some task, is indicated at 204. A path 206 (sometimes referred to as a "default" path) from a current position of robot 200 to destination 204 has been calculated, e.g., by manager path planning engine 154a or local path planning engine 154b, to avoid an obstacle 208. In some implementations, the default path 206 may be calculated to attempt to veer robot 200 towards the centers of spatial regions, although this is not required.

A sequence of spatial regions has been identified and reserved for robot 200, e.g., by spatiotemporal reservation engine 156. The region in which robot 200 is currently operating is lightly shaded, and the next five regions through which robot 200 will pass and/or operate are more darkly shaded. The current spatial region is reserved for robot 200 during a first time interval, T=1. A next contiguous spatial region that lies below and to the right of the current spatial region is reserved for robot 200 during a second time interval, T=2. And so on until robot 200 reaches destination 204 during a last time interval of the sequence of time intervals, T=6. Assuming robot 200 encounters no obstacles or hazards during its travels, robot 200 may traverse along path 206 through the sequence of contiguous spatial regions such that robot 200 operates in each spatial region during a corresponding time interval during which the spatial region is reserved for robot 200.

Figure 3:
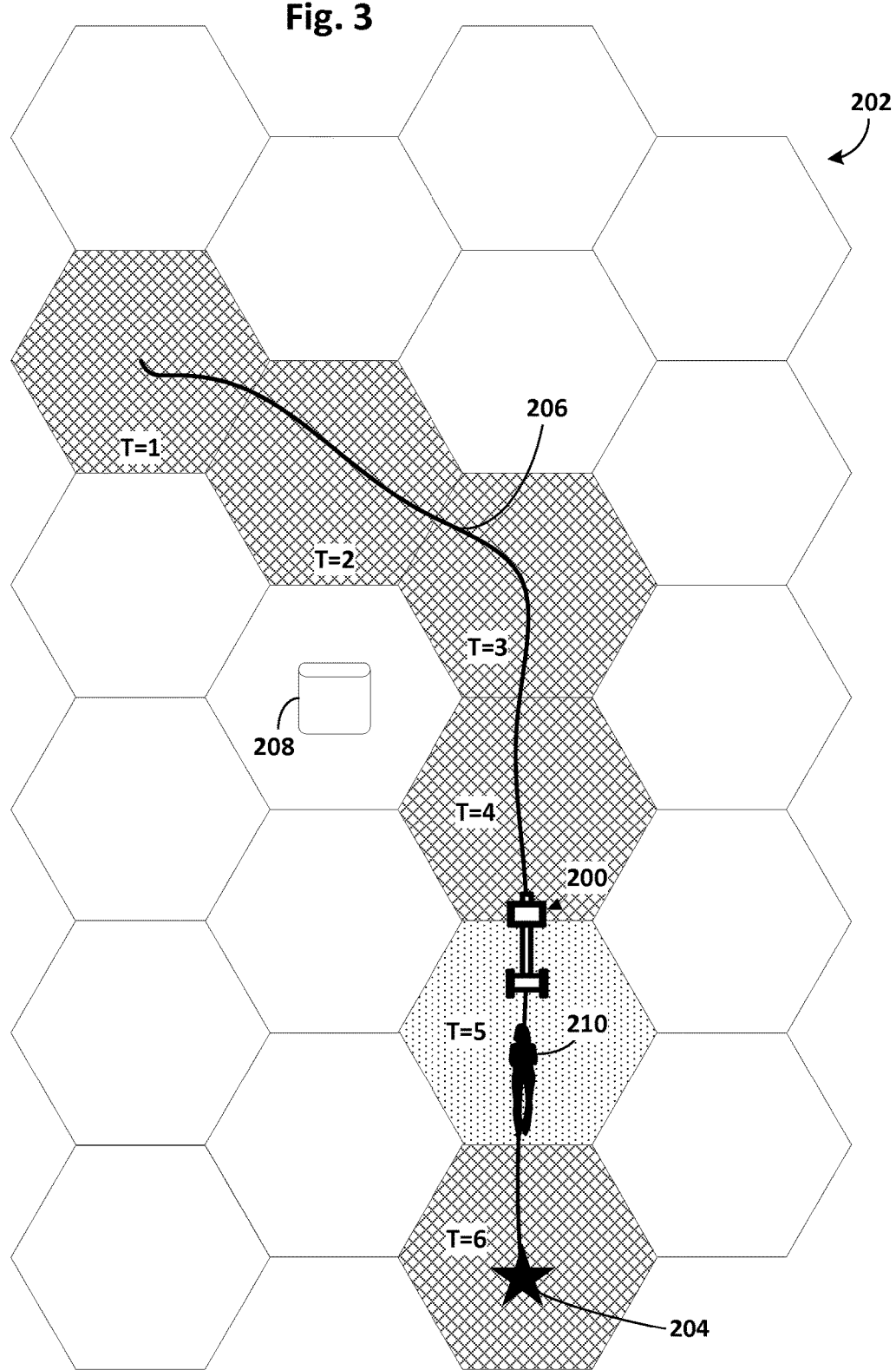
FIG. 3 depicts the example of FIG. 2 after a passage of a time interval when the robot's path becomes unpassable.

However, there may be instances where robot 200 encounters an obstacle or hazard along the way. In FIG. 3, for instance, a person 210 has wandered into path 206 of robot 200 within the region reserved for robot 200 during time interval T=5. In some implementations, robot 200 itself may detect person 210, e.g., using one or more sensors (e.g., 108) such as a camera, presence sensor, microphone, etc. In other implementations, person 210 may be detected by another entity, such as another robot, and reported to obstacle/hazard tracking engine 160, which may then notify robot 200 of the presence of person 210. In some implementations, the presence of person 210 in path 206 may be predicted ahead of time, e.g., based on a velocity of person 210. Whatever the case, robot 200 may take various evasive actions that comport with the spatiotemporal regions reserved for robot 200. For example, robot 200 may identify and traverse an alternative path through the spatial region reserved for time interval T=5 to avoid person 210.

Figure 4:
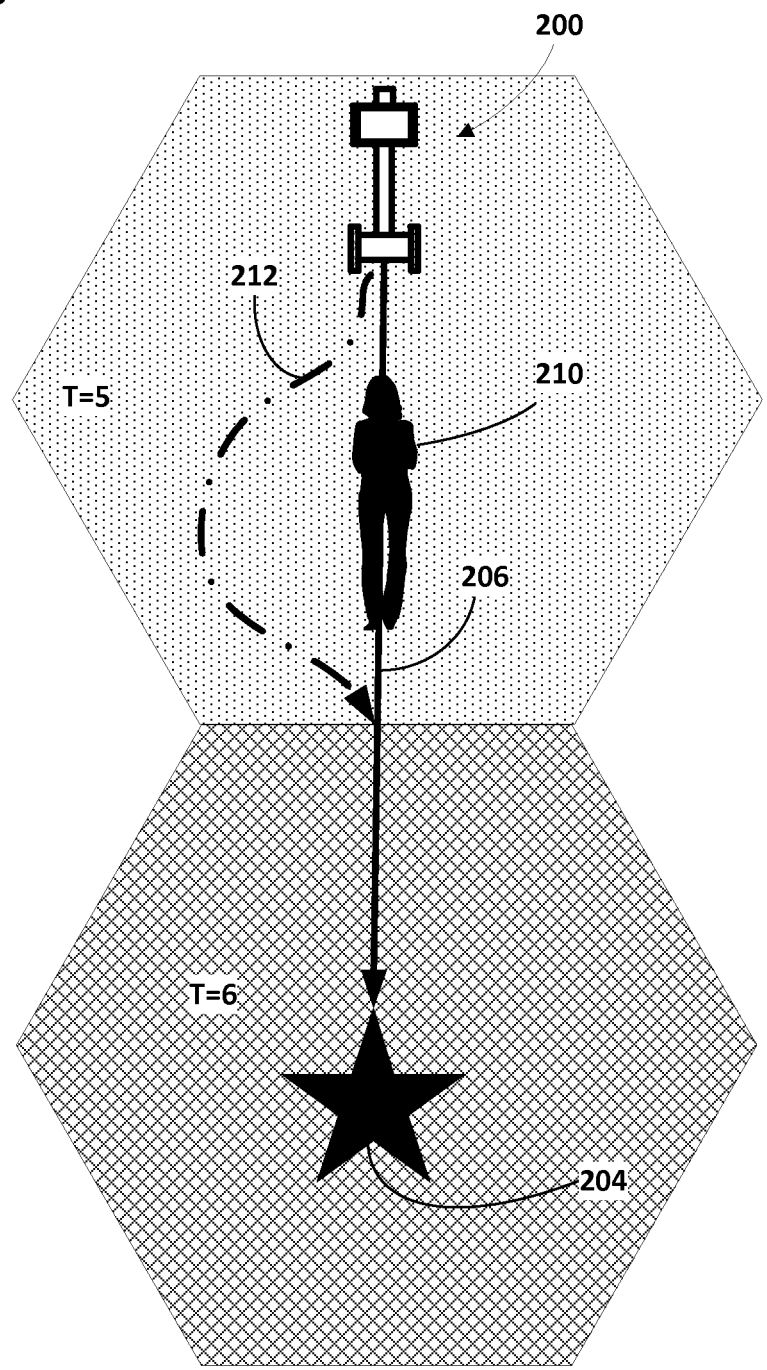
FIGS. 4 and 5 schematically depict two different ways the robot may respond to the obstacle it encountered in FIG. 3, in accordance with various implementations.

One example of how robot 200 may avoid person 210 is depicted in FIG. 4. Robot 200 has calculated, e.g., by way of local path planning engine 154b, an alternative path 212 through the spatial region reserved for robot 200 during time interval T=5. Alternative path 212 in this example leads from the current location of robot 200 at the moment person 210 is detected to a location that regains the original path 206 that robot 200 was traversing through the sequence of spatiotemporal regions. Alternative path 212 may be traversable by robot 200 during the time interval T=5, such that robot 200 may enter into and operate within the next spatial region during the next time interval, T=6, during which the next spatial region is reserved for robot 200.

Figure 5:
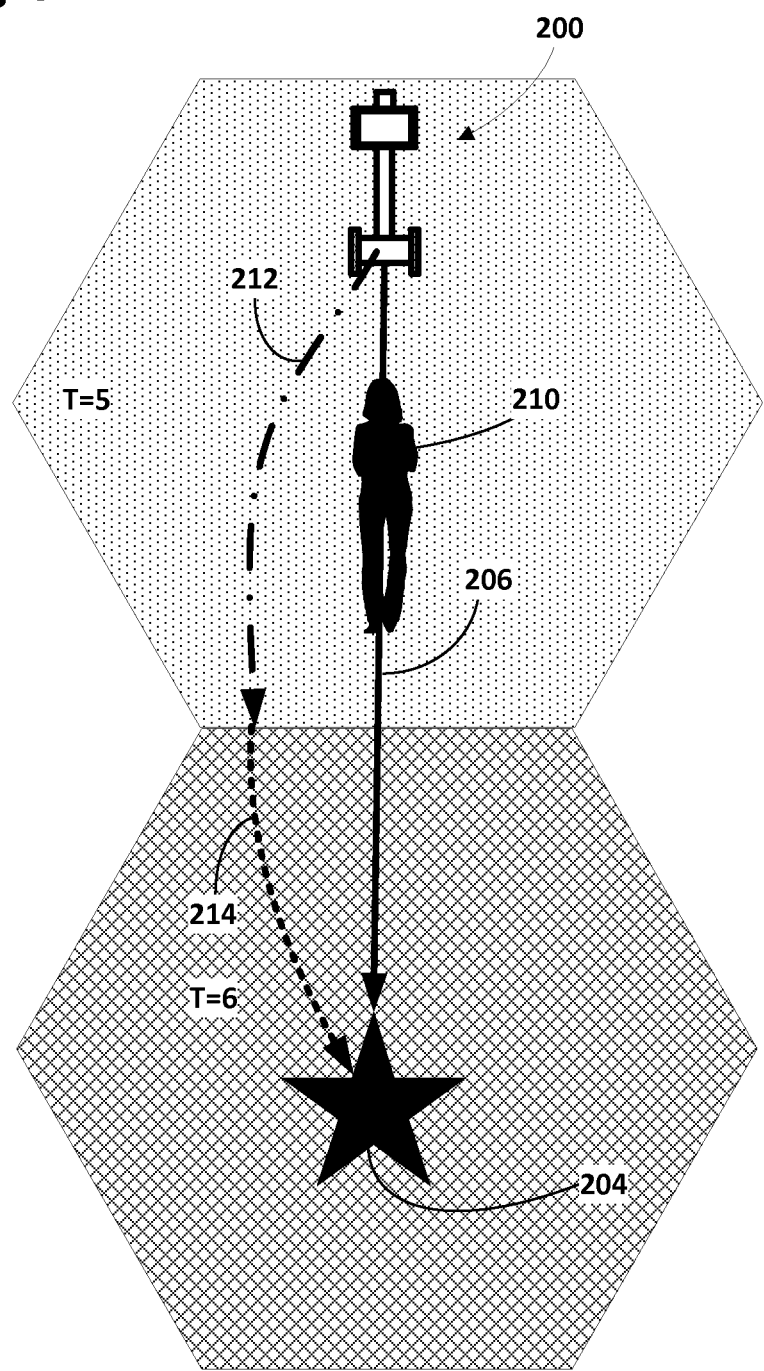

It may not always be possible for robot 200 to regain the original path 206 in a subsequent spatial region that immediately follows the current region while still comporting with the sequence of spatiotemporal reservations for robot 200. For example, person 210 may be moving parallel to path 206 such that robot 200 would not be able to regain original path 206 within the time interval, T=5 and thus cannot follow path 206 through a subsequent region reserved for the time interval, T=6. In such case, and as depicted in FIG. 5, robot 200 may identify a subsequent alternative path 214 through the subsequent region, T=6. The subsequent alternative path 214 through the subsequent region may be traversable by robot 200 during the subsequent time interval, T=6, and the first alternative path 212 may connect to the subsequent alternative path 214. In some instances, the subsequent alternative path 214 may eventually regain original path 206, but in FIG. 5, the subsequent alternative path 214 goes to destination 204.

Situations may arise in which a robot (e.g., 100, 200) will not be able to pass through a sequence of spatiotemporal regions reserved for it. For example, one or more obstacles or hazards may arise that may delay the robot for a sufficiently long period of time that the robot cannot make it to the next spatial region before the next time interval begins. In such situations, the sequence of spatiotemporal regions reserved for the robot may be released, and a new sequence of spatiotemporal regions may be calculated, e.g., by the robot itself and/or by robot management system 150. As another example, a robot may be rendered inoperable. Should that occur, in various implementations, a sequence of spatiotemporal regions reserved for the robot may be released, and other robots may thereafter treat the inoperative robot as an obstacle.

Figure 6:
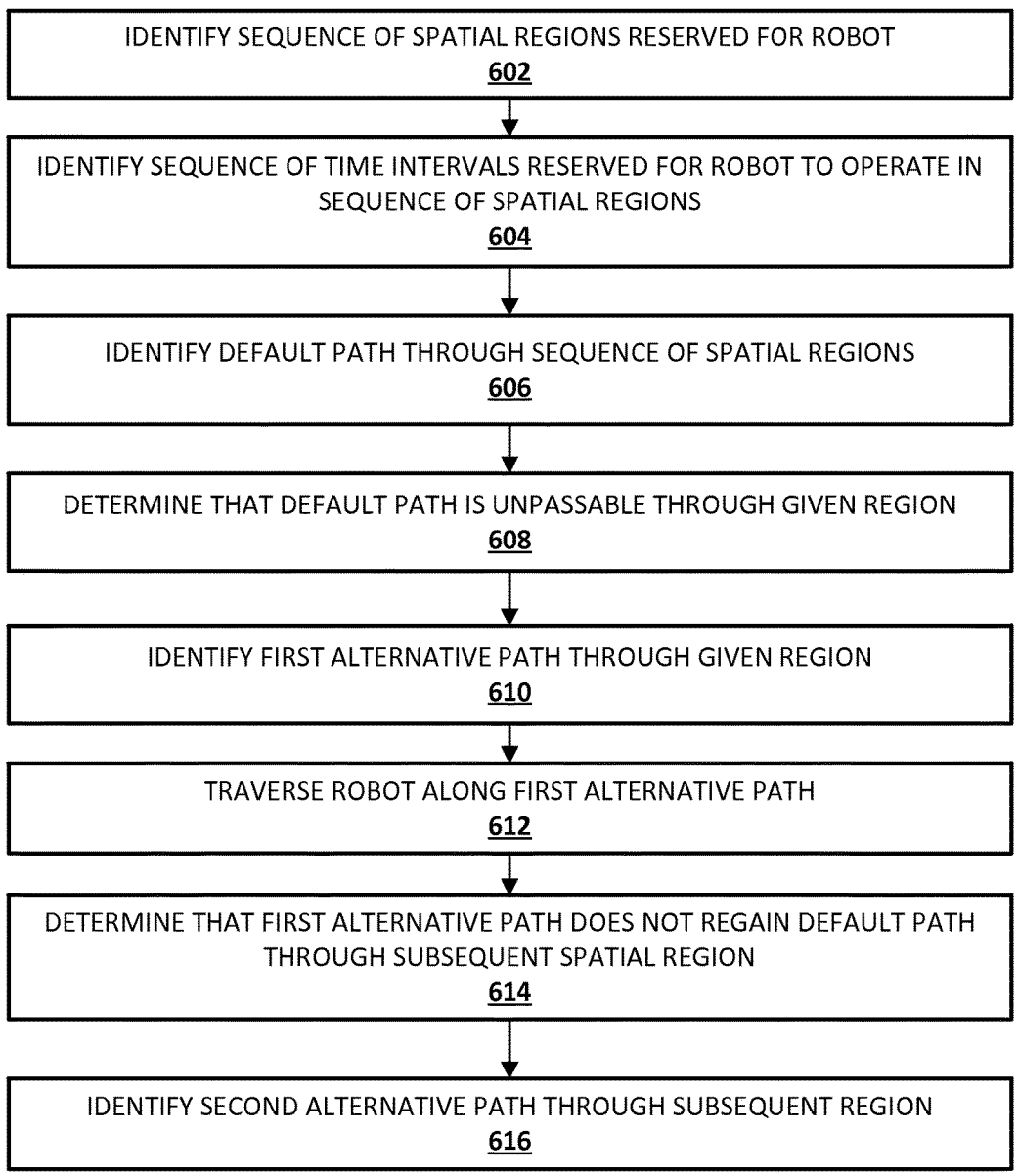
FIG. 6 depicts an example method for operating a robot within a sequence of spatiotemporal regions, in accordance with various implementations.

Referring now to FIG. 6, an example method 600 of reserving a sequence of spatiotemporal regions for a robot and operating a robot within those regions is depicted. For convenience, the operations of flow charts are described with reference to a system that performs the operations. This system may include various components of various computer systems, including computing elements of robots $100_{1-N}$ and/or robot management system 150. Moreover, while operations of method 600 are shown in a particular order, this is not meant to be limiting. One or more operations may be reordered, omitted or added.

At block 602, the system may identify a sequence of spatial regions of an environment that are reserved for the robot. At block 604, the system may identify a sequence of respective time intervals that are reserved for the robot to operate within the sequence of spatial regions. As noted above, the spatial region and corresponding time interval may collectively be referred to as a "spatiotemporal region." At block 606, the system may identify a default path through the sequence of spatial regions. The default path may be traversable by the robot during the sequence of time intervals reserved for the robot to operate within the sequence of spatial regions.

At block 608, the system may determine that the default path is unpassable by the robot through a given spatial region during a given time interval during which the given region is reserved for the robot. For example, the robot may observe, e.g., using one or more sensors (e.g., 108), an obstacle or hazard in its path (i.e. the first default path). Or, the robot may be notified of an obstacle by a remote computing device, such as robot management system 150 or another robot. At block 610, the system may identify a first alternative path through the given region. The first alternative path may be traversable by the robot during the given time interval. At block 612, the system may cause the robot to traverse the first alternative path through the given region within the given time interval.

In some situations, the first alternative path may not regain the default path, e.g., because the first alternative path is, e.g., by necessity, too long for the robot to regain the default path in time. According, in such situations, at block 614, the system may determine that the first alternative path does not regain the default path through a subsequent region. Consequently, at block 616, the system may identify a second alternative path through the subsequent region, wherein the second alternative path is traversable by the robot during a subsequent time interval during which the subsequent region is reserved for the robot. The first alternative path may connect to the second alternative path.

Figure 7:
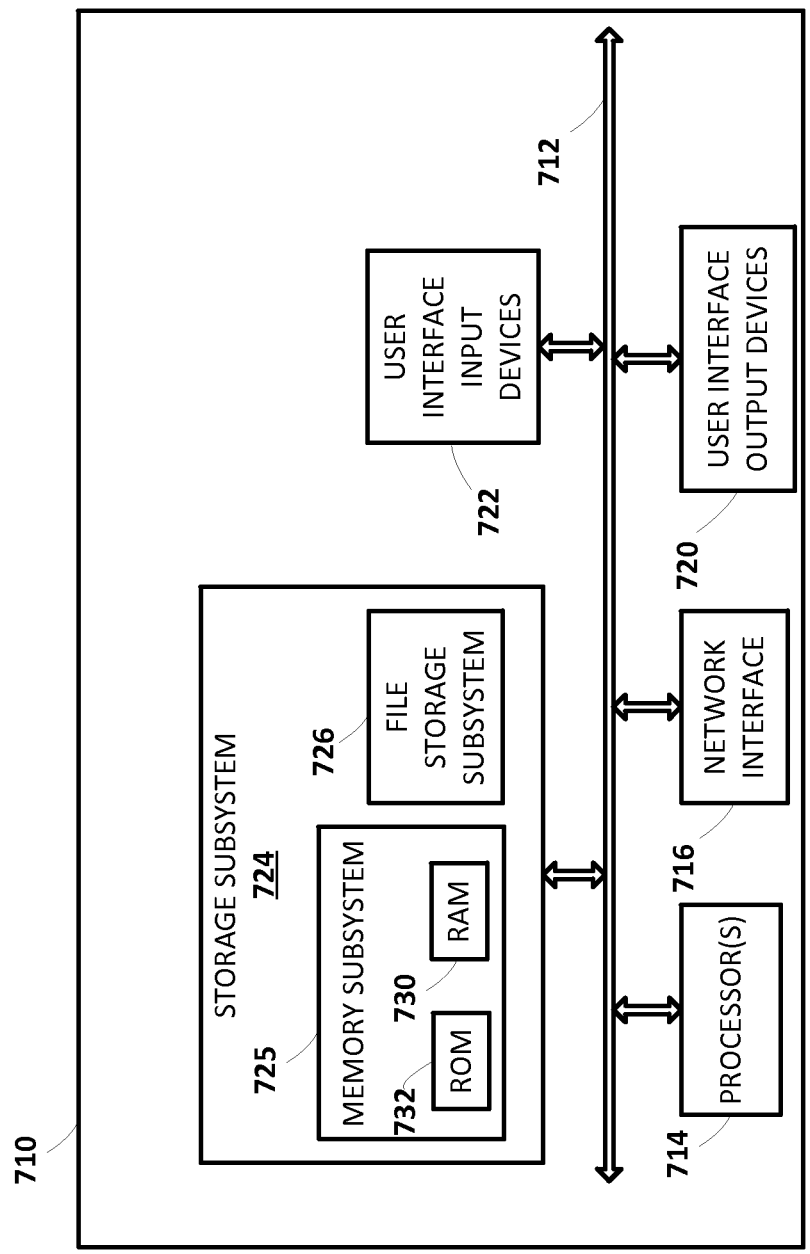
FIG. 7 schematically depicts an example architecture of a computer system.

FIG. 7 is a block diagram of an example computer system 710. Computer system 710 typically includes at least one processor 714 which communicates with a number of peripheral devices via bus subsystem 712. These peripheral devices may include a storage subsystem 724, including, for example, a memory subsystem 725 and a file storage subsystem 726, user interface output devices 720, user interface input devices 722, and a network interface subsystem 716. The input and output devices allow user interaction with computer system 710. Network interface subsystem 716 provides an interface to outside networks and is coupled to corresponding interface devices in other computer systems.

User interface input devices 722 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 710 or onto a communication network.

User interface output devices 720 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 710 to the user or to another machine or computer system.

Storage subsystem 724 stores programming and data constructs that provide the functionality of some or all of the modules described herein. For example, the storage subsystem 724 may include the logic to perform selected aspects of method 600, and/or to implement one or more aspects of robots $100_{1-N}$ and/or robot management system 150. Memory 725 used in the storage subsystem 724 can include a number of memories including a main random access memory (RAM) 730 for storage of instructions and data during program execution and a read only memory (ROM) 732 in which fixed instructions are stored. A file storage subsystem 726 can provide persistent storage for program and data files, and may include a hard disk drive, a CD-ROM drive, an optical drive, or removable media cartridges. Modules implementing the functionality of certain implementations may be stored by file storage subsystem 726 in the storage subsystem 724, or in other machines accessible by the processor(s) 714.

Bus subsystem 712 provides a mechanism for letting the various components and subsystems of computer system 710 communicate with each other as intended. Although bus subsystem 712 is shown schematically as a single bus, alternative implementations of the bus subsystem may use multiple busses.

Computer system 710 can be of varying types including a workstation, server, computing cluster, blade server, server farm, smart phone, smart watch, smart glasses, set top box, tablet computer, laptop, or any other data processing system or computing device. Due to the ever-changing nature of computers and networks, the description of computer system 710 depicted in FIG. 7 is intended only as a specific example for purposes of illustrating some implementations. Many other configurations of computer system 710 are possible having more or fewer components than the computer system depicted in FIG. 7.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A robot comprising:
   logic;
   one or more operational components operably coupled with the logic; and
   memory operably coupled with the logic and storing instructions configured to cause the logic to:
   identify a sequence of spatiotemporal regions of an environment that are reserved for the robot;
   cause the operational components to move the robot through the spatiotemporal regions subject to an inter-region influence that tends to maintain the robot along a first path through all of the spatiotemporal regions;
   determine that the first path will be unpassable by the robot through a given spatiotemporal region; and
   cause the operational components to move the robot through the given spatiotemporal region subject to an intra-region influence that maintains the robot along a second path through the given spatiotemporal region, wherein the intra-region influence outweighs the inter-region influence.

2. The robot of claim 1, wherein at least two of the sequence of spatiotemporal regions overlap temporally.

3. The robot of claim 1, wherein the sequence of spatiotemporal regions are spaced contiguously.

4. The robot of claim 1, wherein the memory further stores instructions configured to cause the logic to determine that an obstacle has been detected obstructing the first path.

5. The robot of claim 4, wherein the detection is performed by the robot.

6. The robot of claim 1, wherein the memory further stores instructions configured to cause the logic to determine that an obstacle is predicted to obstruct the first path through the given spatiotemporal region.

7. The robot of claim 1, wherein the first path is calculated by the robot.

8. A method for implementation by one or more processors, comprising:
   identifying a sequence of spatiotemporal regions of an environment that are reserved for a robot;
   causing operational components of the robot to move the robot through the spatiotemporal regions subject to an inter-region influence that tends to maintain the robot along a first path through all of the spatiotemporal regions;

determining that the first path will be unpassable by the robot through a given spatiotemporal region; and causing the operational components to move the robot through the given spatiotemporal region subject to an intra-region influence that maintains the robot along a second path through the given spatiotemporal region, wherein the intra-region influence outweighs the inter-region influence.

9. The method of claim 8, wherein at least two of the sequence of spatiotemporal regions overlap temporally.

10. The method of claim 8, wherein the sequence of spatiotemporal regions are spaced contiguously.

11. The method of claim 8, further comprising determining that an obstacle has been detected obstructing the first path.

12. The method of claim 11, wherein the detection is performed by the robot.

13. The method of claim 8, further comprising determining that an obstacle is predicted to obstruct the first path through the given spatiotemporal region.

14. The method of claim 8, wherein the first path is calculated by the robot.

15. At least one non-transitory computer-readable medium comprising instructions that, in response to execution of the instructions by one or more processors, cause the one or more processors to perform the following operations:

identifying a sequence of spatiotemporal regions of an environment that are reserved for a robot;

causing operational components of the robot to move the robot through the spatiotemporal regions subject to an inter-region influence that tends to maintain the robot along a first path through all of the spatiotemporal regions;

determining that the first path will be unpassable by the robot through a given spatiotemporal region; and causing the operational components to move the robot through the given spatiotemporal region subject to an intra-region influence that maintains the robot along a second path through the given spatiotemporal region, wherein the intra-region influence outweighs the inter-region influence.

16. The at least one computer-readable medium, of claim 15, wherein at least two of the sequence of spatiotemporal regions overlap temporally.

17. The at least one computer-readable medium, of claim 15, wherein the sequence of spatiotemporal regions are spaced contiguously.

18. The at least one computer-readable medium, of claim 15, further comprising instructions for determining that an obstacle has been detected obstructing the first path.

19. The at least one computer-readable medium, of claim 18, wherein the detection is performed by the robot.

20. The at least one computer-readable medium, of claim 15, further comprising instructions for determining that an obstacle is predicted to obstruct the first path through the given spatiotemporal region.

* * * * *